United States Patent [19]

Appelhans et al.

[11] 4,026,749
[45] May 31, 1977

[54] METHOD AND APPARATUS FOR THE MANUFACTURE OF COLLAR-INSERTS AND BASE-PLUS SEAL-INSERTS FOR PERFORMANCE OF THIS METHOD

[75] Inventors: Antonius Friedrich Appelhans; Felix Franz Robers; Ulrich Stemick, all of Nordhorn, Germany

[73] Assignee: Nino Aktiengesellschaft, Nordhorn, Germany

[22] Filed: Feb. 5, 1976

[21] Appl. No.: 655,517

[30] Foreign Application Priority Data

Feb. 6, 1975 Germany .......................... 2504917

[52] U.S. Cl. ............................. 156/252; 156/299; 156/580
[51] Int. Cl.² ........................................ B32B 31/00
[58] Field of Search .......... 156/252, 299, 580, 583; 100/295; 83/467 R, 451

[56] References Cited

UNITED STATES PATENTS

| | | | |
|---|---|---|---|
| 2,760,273 | 8/1956 | Bregman | 156/252 |
| 3,166,995 | 1/1965 | Afsanick | 156/583 |
| 3,246,443 | 4/1966 | Slemmons | 156/583 |
| 3,392,761 | 7/1968 | Klein | 83/467 |

*Primary Examiner*—Douglas J. Drummond
*Attorney, Agent, or Firm*—Martin A. Farber

[57] ABSTRACT

A method and apparatus for the manufacture of collar inserts made of a base insert and a seal insert, by which the base insert and the seal insert are introduced in the sealing press lying aligned on each other. The base insert and the seal insert are provided with at least two truing openings, respectively, corresponding in arrangement to truing mandrels on a support, the latter being insertable in a sealing press with the base insert and the seal insert disposed on each other aligned with the truing mandrels inserted in the respective truing openings of the inserts.

11 Claims, 7 Drawing Figures

METHOD AND APPARATUS FOR THE MANUFACTURE OF COLLAR-INSERTS AND BASE-PLUS SEAL-INSERTS FOR PERFORMANCE OF THIS METHOD

The present invention relates to a method and apparatus for the manufacture of collar inserts or stiffeners made of a base insert and a seal insert, by which the base insert and the seal insert are introduced in the sealing press lying aligned on each other.

Such collar inserts are provided for the purpose of being form-fittingly or complementarily inserted between the outer-disposed material sides of double layer collars for shirts or the like. In this manner a stiffening of the collar is achieved which produces a continuously uniform good shapestability. The basic or standard multi-layer formed collar inserts comprise a larger surface base insert and a smaller surface seal insert. The production of these multi-layer collar inserts is however associated with difficulties, since for the subsequent exact seated position of the insert in the collar, there must be achieved a completely uniform projecting length of the larger surface base insert relative to the seal insert. The known methods for production of such collar inserts or linings use exceptionally costly working operations. With these methods, base inserts and seal inserts must be laid on one another by hand on a punctated table, and the uniform edge distance between both of the inserts must be fixed and established in a complicated manner with spacers or with the aid of templates. Spacers previously depending on the shape of the collar and size must be correspondingly fitted and arranged. Before the then aligned inserts which lie on each other can be pasted together dead flat and over their complete surface, yet further beyond this there exists the necessity to punctually paste both of the inserts initially with heated pins or the like, in order to prevent further slipping of the inserts during the further working operations.

It is an object of the present invention, especially in addition to those objects which may be gathered from the specification and claims, to provide an advantageous method as well as a corresponding apparatus for performance of this method for the production of the mentioned collar inserts wherein not only the number of the necessary working steps or operations is optimumly reduced, but also beyond that particularly the necessary truing operation is made considerably easier independent of the shape and size of the collar inserts to be fabricated and may be performed without any loose auxiliary means.

This object is solved in accordance with one object of the invention by the features set forth in at least claim 1. The other claims illustrate other objects and advantageous solutions of the invention.

As a result of such embodiments of the invention there is achieved with the use of a simple device, an advantageous method for the economical production of multi-layered collar inserts. In order to provide the inserts with the truing openings, the stamp or punch device merely needs to be correspondingly set once. Expediently all inserts are provided here with truing openings independent of the size and shape- at the same distances from the center line. In this manner additional setting up time is avoided. The stamping-outs of the truing openings do not require an additional expenditure in work or tools, since during stamping-out of the shapes of the inserts, simultaneously the truing openings are formed therewith. By these advantageous provisions it is thus also possible to quickly and exactly provide the corresponding truing operation for the uniform or constant projecting length of the base insert relative to the seal insert independent of the size and shape of the collar inserts to be made, without additional auxiliary means on the same truing device. All additional measuring and alignment work is done away with; the inserts, employing the truing openings, are merely placed or stuck on the truing mandrels, and then they always lie in precise alignment relative to each other, this not only with respect to a projecting length which is constant in the entire projecting range, but also with repsect to an always constant measure or amount of the projecting length. By the simple sticking-on (i.e., sticking through) of the inserts on the truing mandrels, there is attained yet not only the desired pecise alignment, but also even the necessity of a provisional gluing or pasting together is made unnecessary and is avoided, since the truing mandrels are not required to be removed and the inserts consequently can no longer slip during the subsequent working operations. In this, it is possible to introduce the support with the inserts laid thereon as an entity immediately into the press for the gluing or pasting operation and to paste the inserts together directly over their entire surfaces, i.e., dead flat. In order to attain an optimum employment of the method of the present invention, the apparatus is constructed exceptionally favorable in service by a most simple formation. The truing mandrels are provided inserted or sunk in the support, whereby the outwardly projecting position of the mandrels is held under spring biasing. In this manner it is achieved that in the sealing press the truing mandrels are pressed back or downwardly into the support by the press, and consequently an optimum pasting-together is attained, also in the ranges of the truing openings, by the closed press surfaces, whereby there is an advantageous slit-formation of the truing openings, the latter being practically totally closed and thus remaining substantially inconspicuous. With the finished collar this subsequently brings about the advantage that neither the truing openings are visable through the outer material of the collar, nor do bulges occur by projecting corners. During opening of the sealing press after the pasting-together operation, in order to prevent the pressed back truing mandrels from pressing strongly on the then fast connected inserts immediately again from the support, and possibly causing deformation thereof, the truing mandrels are held advantageously in the fixed pulled back position initiated by the press, so long until this fixed position is again deliberately released. A corresponding control means advantageously may also be used for a complete withdrawal or pull-in of the truing mandrels behind the support-level of the support, for example, by means of a corresponding leading or forward inclination portion generating the axial stroke. A simplest removal from the support of the pasted-together inserts is possible even without any danger of again widening the truing openings and developing projecting edges or points. In this manner also after the removal from the support, the completely level and smooth or self-faced formation is maintained. Since the stiffening of the inserts already occurs very quickly, in an advantageous manner the truing mandrels can simultaneously assume an ejector-function, in which they facilitate an advantageous undergripping removal by at least a partial lifting. The fixed holding of the truing mandrels in the pulled-back position can be achieved by a most simple holding means, which again is releasable with a manual movement outwardly for a new truing alignment of other inserts. A mechanical control could also be provided. Production advantages over this embodiment moreover can yet be achieved additionally by an advantageous form of the truing mandrels. It is advantageous to define the cross-sectional form from a plurality of cut-like lamellae standing angularly to one another, which bring not only the advantage of the smallest possible break-through openings in the inserts, but rather beyond that, a position stabilization of the aligned inserts in all horizontal directions of movement with optimumly favorable distribution or break-up of the forces possibly occurring on the break-through opening points. The keeping of set laying habits or patterns, for example, in order to bring a coated surface of the seal insert always in connection with a predetermined surface of the base insert, can be guaranteed in a manner where both of the truing mandrels, and correspondingly the openings of the inserts, possess different cross-sectional shapes with respect to each other. A likewise advantageous feature concerning this resides in an arrangement of both of the truing openings at different distances on both sides of the transverse center line of the insert, so that a laterally reversed laying of the inserts on each other becomes evident by a conspicuous projecting portion of one insert relative to the other insert. The problem of a foolproof loading permits still also an apparatus-wise solution, and indeed in the manner where both of the truing mandrels are arranged at different distances on both sides of the transverse center line of the support. Here, with a corresponding dimensioning of the support, the not proper, i.e., laterally reversed laid-on insert would project edgewise and would occupy a conspicuous edge range or near edge position.

With the above and other objects and advantages in view the invention will become more clearly understood from the following detailed description of preferred embodiments thereof when considered with the accompanying drawings, of which:

Figure 1:
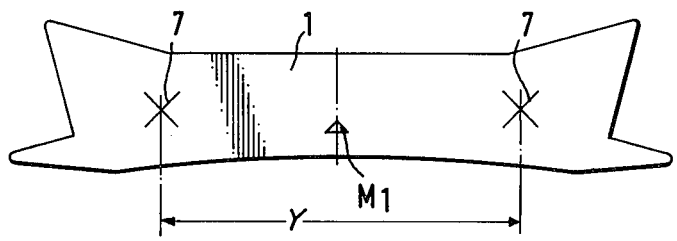
FIG. 1 is a plan view of a base insert.
Figure 2:
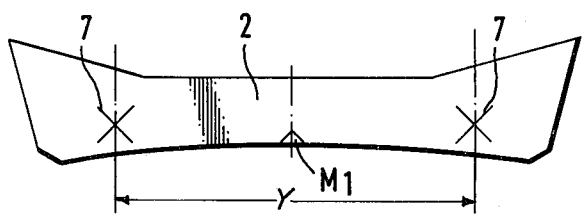
FIG. 2 is a plan view of a seal insert to be connected with the base insert.
Figure 3:
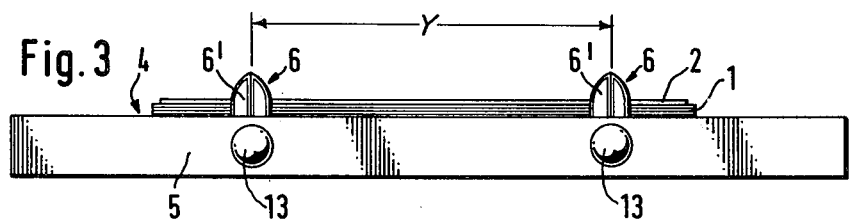
FIG. 3 is a side elevational view of the inserts applied on a truing support.
Figure 4:
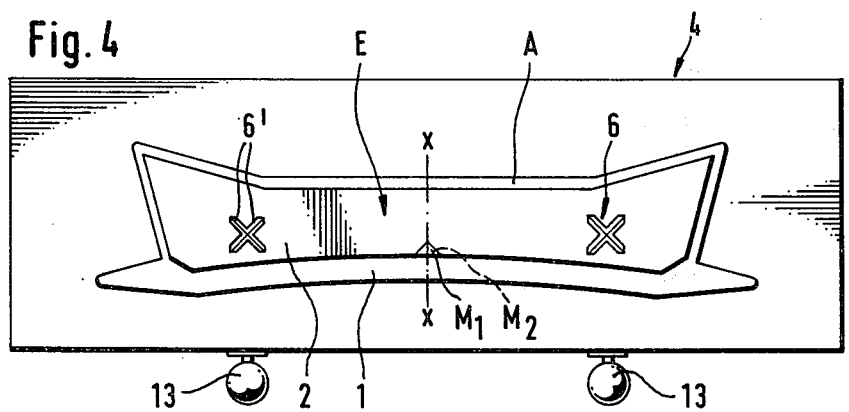
FIG. 4 is a plan view of FIG. 3.
Figure 5:
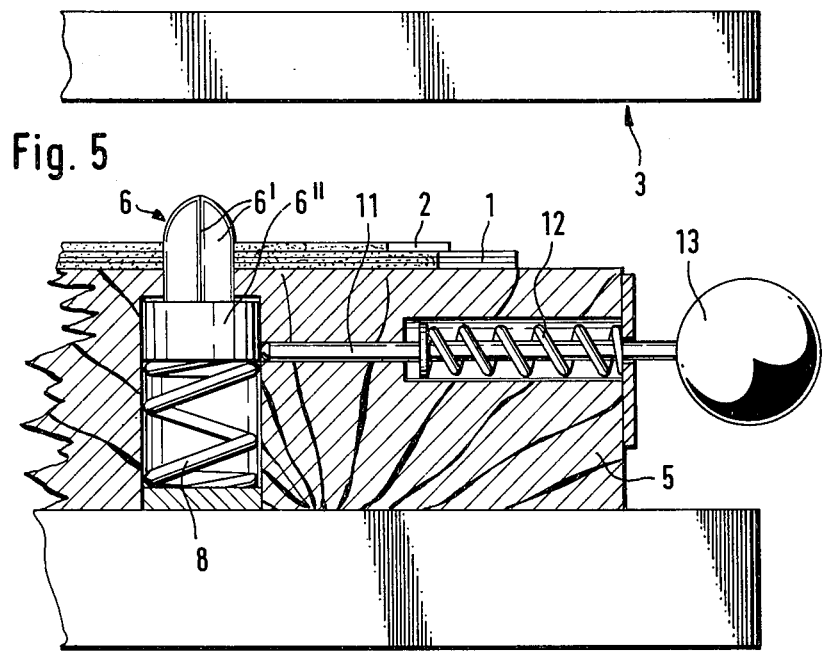
FIG. 5 is an enlarged cross-sectional view of FIGS. 3 and 4 in the range of a truing mandrel, the view being partly broken away.

Referring now to FIGS. 1 –6 of the drawings, the collar insert E to be finished or manufactured comprises a base insert 1 and a seal insert 2. The base insert and the seal insert are pasted together dead flat or over the complete surfaces thereof on a schematically illustrated sealing press 3.

The base insert 1 as well as the seal insert 2 are formed with a large surface. For an exact form fitting or complementary positioning of the collar insert in a collar it is necessary that the projecting length A between the larger surface base insert 1 and the smaller surface seal insert 2 is held or kept completely uniformly. Consequently it is necessary to adjust or true both of the inserts 1 and 2 in a corresponding position in the sealing press prior to the pasting together step.

This truing or alignment takes place in a simplest manner on the device 4 of the present invention, which device comprises a plate shaped support 5 and truing mandrels 6 projecting from the upper surface of the support. The truing mandrels 6 comprise preferably cutting-type lamellae 6' which stand angularly to each other, and which have an X - cross-sectional shape as illustrated, or a Y - cross-sectional shape or similar shapes: star-shape, V-shape, I-shape, straight slot-shape.

The truing mandrels 6 according to the embodiment example are formed spear pointed in a direction toward their free ends. This favors the stick on placement of the inserts.

For a simple truing of both of the inserts 1, 2, the latter have been already provided during the punching or stamping out formation of their surface shapes simultaneously with truing openings 7 which extend corresponding to the cross-section of the truing mandrels 6, the openings 7 merely being selected in the form of slits. By the simultaneous stamping of the surface form and of the truing slits, there is always provided a constant uniform position of the truing openings in the surface area of the inserts 1, 2. The stamping tool or knife therefor merely needs to be correspondingly set or adjusted only once.

Since the spacing y of the truing slits 7 of the inserts 1, 2 is selected corresponding to the spacing of the truing mandrels 6, the inserts 1, 2 can be inserted or stuck on the truing mandrels in simple manner immediately after the stampings, and they then lie flat and the desired predetermined precise alignment position on each other on the support 5.

The inserts are thereby secured simultaneously against slipping by means of the mandrels 6, so that without additional pre-pasting, the support 5 can be introduced with the thereon lying inserts 1, 2 immediately into the sealing press 3.

In order to attain a total surface pasting or adhering-together pressing operation, the truing mandrels 6 advantageously are formed countersunk or inserted in the support 5.

The truing mandrels 6 are inserted or lowered in corresponding pocket bore or drill - like formed bores 9 against the pressure of compression springs 8 by means of the pressure of the press 3, whereas a collar 6" of the truing mandrels, which collar is adjusted to the cross-sectionally larger shape and diameter of the lower portion of the bore 9 provides an abutment or shoulder limit for the outwardly projecting position of the mandrels 6. That is the enlarged collar 6" of the mandrels 6, respectively, constitutes a shoulder abutment limit stop for the upward projection of the mandrels 6 above the surface of the support 5, the bores 9 being step-shaped and with the mandrels 6 and collars 6" adjusted shapewise thereto. The compression spring 8 abuts the bottom of the collar 6" thereby biasing each mandrel 6 upwardly. The mandrels 6 are mounted so as to be prevented from turning or secured against turning. The corresponding rotation-securing may be realized for example, by a beveling of the guiding and guided parts or by formation of the upper support-insert opening (the upper narrower portion of the step shaped bores 9) so as to be adjusted or complementary in contour to the cross-section of the truing mandrels 6.

Figure 6:
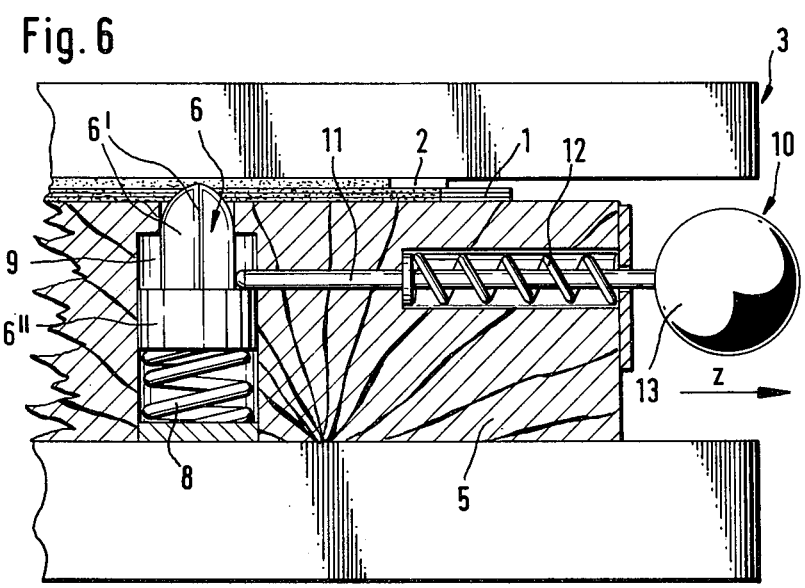
FIG. 6 is a view similar to FIG. 5 during the pressing operation.

In the pressed back or pressed down position of FIG. 6, the truing mandrels 6 are fixed or secured by a stop catch locking device 10. This locking device comprises a locking or detect pin 11, which steps engagingly behind the cross-sectionally enlarged section 6" of the pressed down mandrel 6 by means of the biasing action of a spring 12 disposed in a transverse recess of the support 5 and operatively acting on the detent pin 11, as well as a release handle 13 which is connected from the outside with the detent pin 11. The handle 13 releases the fixed position of the mandrel 6 again by pulling it in the direction of the arrow z against the biasing force of the spring 12.

After the gluing or adhering - pressing operation, the finished pasted-collar insert E can be removed from the support 5 with the mandrels 6 being held in the inward position without the pasted together truing slits again opening, and by release of the locking device 10 the mandrels once again step into truing alignment position.

Figure 7:
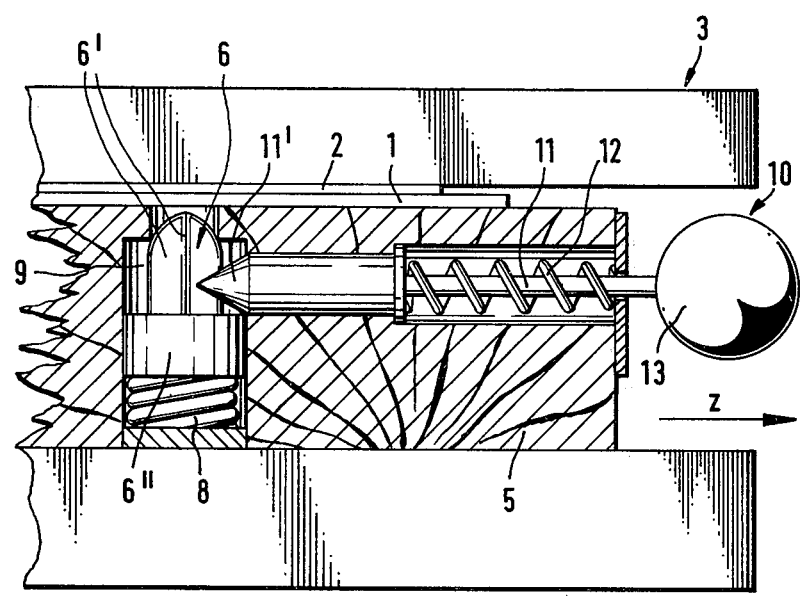
FIG. 7 is a view corresponding to that of FIG. 5 showing another embodiment of the truing support.

Referring now to the embodiment of FIG. 7, this differs from the previously described device only in so far as this provides a completely pulled back position of the truing mandrels 6 under the upper surface of the support 5. For this purpose, the mandrel-sided end of the detent pin 11 has a conical control surface 11' which passes over or crosses the upper edge of the mandrel section 6" which by this is pressed down sufficiently far. The force of the spring 12 is correspondingly greater than that of the spring 8.

It is important in certain cases that the base insert and the seal insert are laid on each other in correct left to right or non-reversed laterally correct position. The coated side of the seal insert must for example meet or coincide with the non-coated side of the base insert. The coated side of the base insert is later pasted together with the collar material. The coated side of the seal insert can thus lie upwardly or also downwardly. In order now to insure that the coated side of the seal insert for example faces the support 5, the truing openings in the inserts and the truing mandrels are asymmetrically arranged on the support: Thus, for example, the left truing opening and the left truing mandrel, each, e.g., are arranged spaced 12 cm from the transverse center line and the right truing opening and the right truing mandrel each are arranged spaced 14 cm. from the transverse center line. A possible laterally reversed arrangement of one of the inserts is immediately evident by a conspicuous projecting length of the same.

The same result occurs, for example, if the left truing opening and the left truing mandrel each have a V-shape, whereas the right truing opening and the right truing mandrel each are formed with an X-shape.

The following measure facilitates the laterally correct laying of the base and seal inserts on each other: The inserts 1, 2 — in any event the insert 1 — have a mark M1 on one longitudinal edge on the transverse center line x—x. The support 5 has likewise a mark M2 which in the laid on condition is covered with the mark or marks M1.

Apparatus-wise this problem can be solved in a manner that both truing mandrels are arranged at different distances on both side of the transverse center line of the support 5.

While we have disclosed several embodiments of the invention, it is to be understood that these embodiments are given by example only and not in a limiting sense.

We claim:
1. A method for the production of collar inserts comprising a base insert and a seal insert, comprising the steps of
    forming by a stamp out operation a larger base insert and a smaller seal insert, respectively, with at least two truing slits, corresponding in arrangement to respective truing mandrels on a support, such that said inserts are shaped in a form of a collar insert having two points for the collar of a garment,
    laying said base insert and said seal insert on each other on the support aligned with the truing slits guided-in on the corresponding truing mandrels, respectively, with a substantially symmetric uniform edge spacing of the edges of said base insert and said seal insert relative to each other, and thereafter
    introducing the support together with the base insert and the seal insert lying aligned thereon in a sealing press,
    sealing said inserts in said sealing press with the simultaneous retracting of said truing mandrels from said slits, and
    inserting the sealed inserts between material sides of a double layer collar.

2. An apparatus for performing the method of claim 1, for the production of collar inserts comprising a base insert and a seal insert, the base insert and the seal insert lying on a support to be introduced into a sealing press, comprising
    a support having truing mandrels means arranged thereon corresponding in arrangement to truing slits in the base insert and the seal insert, respectively, for sticking through said slits, respectively, and
    said truing mandrel means are rearwardly pressably moveably mounted in said support.

3. The method, as set forth in claim 1, further comprising
    biasing the truing mandrels in a position projecting from the support and, rearwardly
    pressing the mandrels in a direction against the biasing, out of said slits into the support during the sealing step in the sealing press.

4. The method, as set forth in claim 3, further comprising,
    ejecting the sealed inserts from the sealing press by the truing mandrels for removing said inserts after being sealed.

5. The apparatus, as set forth in claim 2, further comprising
    means for controlling said truing mandrels means in a completely inwardly moved position relative to said support.

6. The method, as set forth in claim 1, further comprising
    engaging the truing mandrels in a rearwardly pressed position out of the slits of the inserts during the sealing step.

7. The apparatus, as set forth in claim 2, wherein
    said truing mandrels means have a cross-section adjusted to an alignment and shape of the truing slits, and comprise a plurality of cutting-type lamellae extending angularly with respect to each other.

8. The apparatus, as set forth in claim 2, further comprising a knife means for cutting out peripheral edges of the inserts further including cutter means for formation of the truing slits in said inserts, respectively.

9. The method, as set forth in claim 1, wherein the two truing slits are cut with different shapes.

10. The method, as set forth in claim 1, wherein the two truing slits are cut so as to be formed at different distances from a transverse center line of the inserts.

11. The method, as set forth in claim 1, wherein the slits are cut in the form of crosses.

* * * * *